United States Patent [19]

Fullenwider

[11] 4,031,291

[45] June 21, 1977

[54] HYDROGEN-OXIDIZING CATALYST, AND FUEL CELL ELECTRODE USING SAME

[75] Inventor: Malcolm A. Fullenwider, Whitehall, Pa.

[73] Assignees: Malcolm A. Fullenwider; Richard L. Ament, II, both of Allentown, Pa.

[22] Filed: Apr. 5, 1976

[21] Appl. No.: 673,670

[52] U.S. Cl. .................................. 429/40; 252/463; 252/466 PT; 204/290 R
[51] Int. Cl.² ..................... H01M 4/86; H01M 4/94
[58] Field of Search ............. 429/40; 252/462, 463, 252/474, 425.3; 204/290 R, 290 F

[56] References Cited

UNITED STATES PATENTS

| 2,204,733 | 6/1940 | Miller | 252/462 |
| 3,679,773 | 7/1972 | Kovach et al. | 252/462 |

Primary Examiner—John H. Mack
Assistant Examiner—H. A. Feeley
Attorney, Agent, or Firm—Howson and Howson

[57] ABSTRACT

A hydrogen-oxidizing catalyst, comprising a body of yttrium coated with a thin surface layer of copper or platinum. The catalyst is preferably in powder form, and is especially useful as the catalyst at the hydrogen electrode of a fuel cell. The copper-yttrium combination shows better catalytic activity than shiny platinum in terms of current density for a given anode voltage, and the platinum-yttrium combination is even better, although more expensive than the Cu-Y combination.

15 Claims, 4 Drawing Figures

HYDROGEN-OXIDIZING CATALYST, AND FUEL CELL ELECTRODE USING SAME

BACKGROUND OF THE INVENTION

This invention relates to a new and useful catalyst for oxidizing hydrogen, as is for example desired at the hydrogen electrode of a hydrogen-oxygen low-temperature fuel cell, and as is desirable in many other chemical reactions involving hydrogenation.

There are many such reactions in which hydrogenation is important, and many catalysts have been proposed and used for such purposes. In certain applications such as the fuel cell application mentioned above, in which the $H_2$ molecule is supplied to an electrode of the fuel cell, the catalyst aids in the splitting apart of the $H_2$ molecule into $H^+$ atoms in the electrolyte adjacent the electrode, whereby an electron is transferred to the electrode as desired in the generation of useful fuel cell current; the $H^+$ hydrogen atoms combine with $O^{--}$ oxygen atoms produced at the other fuel cell electrode to form water in the electrolyte. In this process the hydrogen is oxidized in the sense that it acquires a more positive charge i.e. a higher valence. Without a suitable catalyst present, the hydrogen and oxygen will not act as desired to any substantial extent, and there will be no useful fuel cell current.

There are a variety of other applications in which a catalyst is desired to provide oxidizing of hydrogen to facilitate a chemical reaction, for example in the reaction of organic compounds such as are involved in the conversion of shale to useful petroleum products, or in the conversion of noxious engine exhausts to less harmful products by means of catalytic converters.

New catalysts are desired not only from the broad viewpoint that any new catalyst widens the range of raw materials from which catalysts can be made, but also from the viewpoint of obtaining an improved combination of cost and performance of the catalyst. For example, platinum by itself is an excellent catalyst for many purposes, but its cost becomes prohibitive in many applications. It is therefore desirable to provide catalysts of materials which are of less cost per unit mass, or to increase the activity of platinum so that its high cost is more nearly compensated by better performance.

Various mixtures or alloys of different elements have been proposed for use as catalysts, and some have exhibited usefully high catalytic activity at least initially. However, one difficulty which has been encountered in at least some of such catalysts is that when the two or more closely-adjacent components of the mixture or alloy are simultaneously exposed to the electrolyte or other component in the desired chemical reaction, the components of the catalyst often form an electrochemical couple, resulting in dissolution or "leaching" of one component of the catalyst, thereby impairing the useful life of the catalyst.

Accordingly, it is an object of the invention to provide a new and useful hydrogen-oxidizing catalyst, and a fuel cell electrode using same.

Another object is to provide such catalyst which provides excellent activity, especially in view of the cost thereof.

Another object is to provide such catalyst which is substantially impervious to the type of leaching or dissolving action which tends to occur in many types of catalysts involving more than one component, due to interactions with the adjacent chemical environment such as an electrolyte in contact with each of the different components of the catalyst.

It is also an object to provide a fuel cell electrode using the catalyst of the invention, especially a hydrogen electrode for a low-temperature hydrogen-oxygen fuel cell.

SUMMARY OF THE INVENTION

These and other objects of the invention are achieved by the provision of a catalyst comprising a body of yttrium coated with a thin layer of copper or platinum, the layer being preferably only a few atomic layers in thickness. The layers preferably are formed by plating, and the bodies preferably are particles of powder size which, in combination with a large number of other such particles, form a powder suitable for use in the porous electrode of a fuel cell for example, the powder providing a desirably greater surface area per unit mass of the catalyst.

The platinum-coated yttrium of the invention has been found to produce greater activity than shiny platinum by itself, and the copper-coated yttrium has been found also to produce performance superior to shiny platinum, even though copper is a much less expensive material than platinum. In addition, in the catalyst of the invention only the coating metal is exposed to the adjacent active environment, such as the electrolyte in the case of the fuel cell, so that any harmful leaching or dissolving process due to simultaneous exposure of more than one of the catalyst components to the electrolyte or other active component of the reaction system is avoided, with consequent improvements in potential longevity of the catalyst.

BRIEF DESCRIPTION OF FIGURES

These and other objects and features of the invention will become more apparent from a consideration of the following detailed description, taken in connection with the accompanying drawings, in which.

DESCRIPTION OF SPECIFIC EMBODIMENTS

Figure 1:
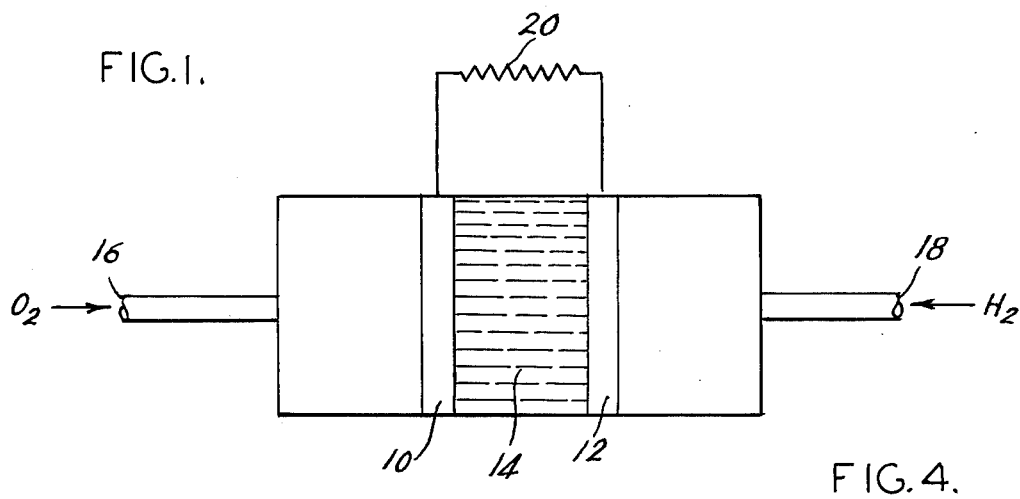
FIG. 1 is a schematic diagram showing a known general configuration of low-temperature hydrogen-oxygen fuel cell, in which the catalyst of the invention is used at one electrode of the fuel cell.
Figure 2:
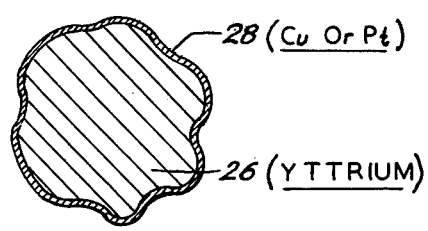
FIG. 2 is an enlarged view of a particle of a catalyst powder, according to the invention.

Referring now to the embodiment of the invention shown, by way of example only, in FIGS. 1 and 2, FIG. 1 illustrates schematically a fuel cell arrangement which is conventional except for its use of the catalyst of the invention. Thus there are provided a pair of mutually-insulated porous electrodes 10 and 12, each loaded with powder-size particles of the catalyst material, and a suitable fuel cell electrolyte 14 contained between the electrodes and extending into the pores of the electrodes and into contact with the catalyst particles. A flow of oxygen in molecular form ($O_2$) is supplied through oxygen supply port 16 to the side of oxygen electrode 10 opposite from the electrolyte 14, and passes through the pores of that electrode into contact with the electrolyte and the catalyst. Similarly, molecular hydrogen ($H_2$) is supplied through hydrogen port 18 to the side of hydrogen electrode 12 opposite from the electrolyte 14, and passes through the pores in that electrode into contact with the electrolyte and catalyst. At hydrogen electrode 12, hydrogen is released into the electrolyte as $H^+$, while at the oxygen electrode 10, oxygen is released into the electrolyte in the form of $O^{--}$; the $H^+$ and the $O^{--}$ combine to form $H_2O$, or water, in the electrolyte. The release of the $H^+$ into the electrolyte corresponds to the delivery of an extra electron to the electrode 12, which is electrically conductive, while the release of the $O^{--}$ at the oxygen electrode corresponds to the loss of two electrons from the conductive oxygen electrode to the electrolyte. As a result, a net flow of electrons occurs from the hydrogen electrode 12 externally through a suitable load device 20 to the oxygen electrode 10.

Since the fuel cell of FIG. 1 may be entirely conventional except for the nature of the catalyst powder with which electrode 12 is loaded, its details have not been shown and need not be described herein. Thus a variety of arrangements are well known for supplying the oxygen and hydrogen into contact with the outside surfaces of the two corresponding fuelcell electrodes; the nature, configuration, and manner of making of such porous electrodes are also well known, as are method and apparatus for suitably loading the pores of the electrodes with small particles of the catalyst in order to effect the desired simultaneous contacting of the electrolyte by the oxygen or hydrogen, and by the catalyst. The catalyst material in electrode 10 may be conventional, for example it may constitute a platinum powder or a powder of some other suitable catalyst material, but the catalyst employed in electrode 12 is constituted according to the present invention, and a typical particle thereof may be as shown in FIG. 2.

Thus in FIG. 2 there is shown a cross-section of a generally-spherical body 26 of yttrium coated over its complete outer surface with a thin layer 28 of copper of a thickness of 1 to 10 atomic layers, and preferably from 1 to 3 atomic layers in thickness. Because of its coating with copper or platinum, the yttrium is shielded from direct physical contact with the electrolyte and hydrogen, and thus harmful leachingout of the yttrium by the action of electrochemical couples is greatly inhibited.

It is believed that the high catalytic activity of the combination of yttrium with copper or platinum in this configuration results from the wide differences in heat of absorption of hydrogen exhibited by yttrium in comparison with either copper or platinum. Thus the heat of absorption of hydrogen exhibited by yttrium has been given in the literature as about −20kcal (mole $H^{-1}$), while the corresponding number for copper has been given as +9, and for platinum as +8.9 according to one reference and as +24.3 according to another reference. Regardless of the exactness of these numbers, it appears that yttrium is near one extreme of the range and platinum and copper are near the opposite extreme, so that the difference between the respective heats of absorption are indeed very high for these combinations of materials.

It is further believed that platinum by itself, which exhibits generally excellent catalytic properties, does so by virtue of the presence just beneath the surface of the platinum of sites of greatly differing heats of absorption, which serve to "rip apart" the hydrogen molecule. The coated yttrium catalyst of the invention, it is believed, simulates this condition in that the yttrium produces similar sites somewhat below the surface of the coated body. Thus it is believed that the catalytic action of the coated yttrium catalyst of the invention is due to the surface layer acting as an interstitial pump in the presence of phonon-interstitial action.

While there have been disclosures in the prior art of proposed catalysts including mixtures comprising copper and yttrium, or platinum and yttrium, they are not in the configuration of the present invention involving a coating of one by a thin layer of the other; accordingly, both components of the mixtures of the prior art are exposed to the electrolyte, and due to the different electrochemical properties of yttrium and copper for example, a rather strong electrical couple will be produced when both are in contact with the same electrolyte solution, with the result that the yttrium may be leached or dissolved rather rapidly, thus changing the nature of the catalyst and its catalytic activity and shortening its potential useful life.

Figure 4:
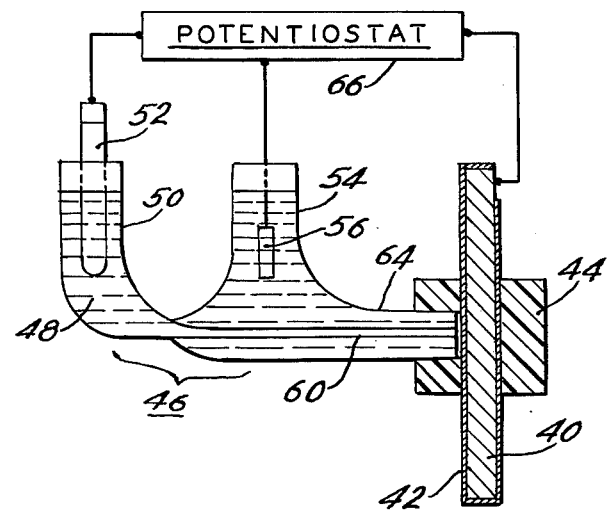
FIG. 4 is a schematic representation of a test arrangement for obtaining the data displayed in FIG. 3, using a wafer of yttrium coated with copper or yttrium.
Figure 3:
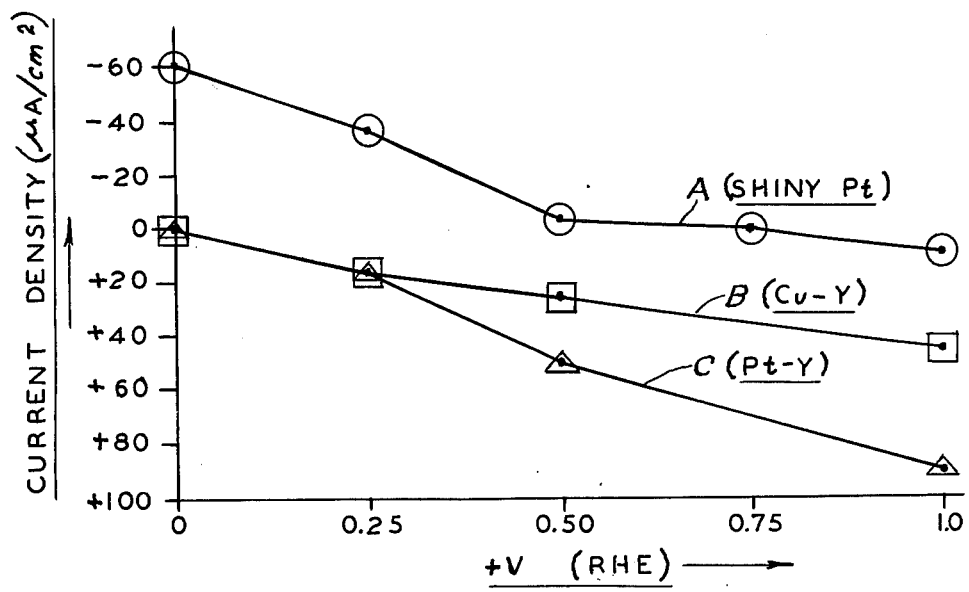
FIG. 3 is a graphical representation showing and comparing the catalytic activity characteristics of shiny platinum, of a copper-yttrium catalyst according to the invention, and of a platinum-yttrium catalyst according to the invention.

To obtain a quantitative estimate of the effectiveness of the catalyst of the invention, measurements were made by the apparatus of FIG. 4 resulting in the graph of FIG. 3, which shows current density at the catalyst surface as ordinates, and positive voltage referred to a reversible hydrogen electrode as abscissae. The experiments utilized a body 40 of yttrium in the form of a rectangular wafer 1 inch × 3 inches × 25 mils in dimensions, the surfaces of which wafer were first slightly abraded to remove any surface reaction products and then plated with copper or platinum. Platinum plating is accomplished by electrodeposition from a 10% platinum chloride solution, diluted 1:10 with 0.1 normal sodium hydroxide, the plating current of about 1 m.a. per square inch being turned on prior to immersion of the wafer in a solution in order to provide cathodic protection. The yttrium wafer was dipped into the platinum electroplating solution for one-half second, to produce thereon a platinum coating about one or two atomic layers in thickness.

Copper coating of the same-sized yttrium wafer was accomplished by electroless plating for about ten seconds in a commercial copper electroless-plating solution, namely a mixture of Cuposit 328A and Cuposit 328B, dissolved in distilled water as recommended by the manufacturer, Shipley Company, Inc. of Newton, Mass. Ten seconds of electroless plating in this solution produced one or two atomic layers of copper coating on the yttrium.

The test arrangement in FIG. 4 constitutes a three-electrode electrochemical cell with potentiostat of the de Ford type, known to experimenters in this field. The wafer 40 described above with the coating 42 of platinum or copper applied as described previously, is supported by an appropriate Teflon gasket 44 clamped against opposite major surfaces of the wafer. The laboratory glassware 46 contains a suitable electrolyte 48 such as 0.1 normal NaOH first saturated with purified argon and then saturated with hydrogen. The apparatus includes a column 50 in which a silver-silver chloride reference electrode 52 is appropriately submerged in the electrolyte. Another column 54 contains a suitable counter electrode 56, which may be of platinum. Column 50 communicates with a Luggin capillary tube 60 the open end of which is located closely adjacent the coated surface of the yttrium block. Column 54 communicates with a tubular portion 64 surrounding and concentric with the capillary tube 60, which again ends immediately adjacent but not touching the surface of the coated wafer 40. The potentiostat 66 was connected in conventional manner to the reference electrode 52, the counterelectrode 56 and the working or test electrode 40, in this example directly to the yttrium. The gasket 44 functions to contain the liquid delivered adjacent the surface of the coated yttrium wafer.

By suitable conventional adjustment of the potentiostat, the voltages applied in the anodic reaction at the electrolyte-catalyst interface were varied and measured, i.e. the voltage between 52 and 40. For purposes of the graphs of FIG. 3, the voltages were calculated in terms of voltage referred to a reversible hydrogen electrode, even though a silver-silver chloride reference electrode was used in the measurements. By varying the voltage and observing the current passing through the wafer to electrode 56, the data were obtained for the points shown in graph 3. In FIG. 3, curve A was obtained when a piece of shiny platinum was used in place of the yttrium-coated wafer, curve B is that for a coppercoated yttrium wafer made as described above, and curve C is for a platinum-coated yttrium layer, made as described above. It will be seen that curve B exhibits substantially more current than the shiny platinum at any given voltage, for example about 43 microamperes compared with about 8 microamperes for shiny platinum, at one volt; the platinum-coated yttrium produced even higher currents, for example about 90 microamperes at one volt. The values of current produced at given voltages in this manner are conventional indicators of catalytic activity as a hydrogen oxidizer, and accordingly these tests indicate a copper-yttrium wafer of greater catalytic activity than shiny platinum, and a platinum-coated yttrium wafer of even greater catalytic activity. Importantly, the copper-yttrium wafer not only provides excellent catalytic properties, but involves two materials which are relatively inexpensive, certainly as compared with platinum.

Since the useful current obtained is equal to the current density multipled by the effective surface area of the catalyst, in commercial applications it has been common to use very fine particles of powders of the catalyst materials, thus increasing the ratio of surface area to volume of the material in order to obtain greater current for the same mass of catalyst. For similar reasons this is also desirable with the catalyst of the invention, and as described above powder-sized particles are preferably produced which may be loaded into the pores of a porous electrode of a fuel cell. A variety of conventional laboratory techniques are available which can be adapted for commercial use in producing such small coated particles.

For example, yttrium may be broken up into particles and reduced to the desired size, typically about 60 mesh (250 microns or less in diameter), preferably by performing a ball-grinding operation in an inert atmosphere. When particles of the appropriate size and form have been produced, they may be immersed for a predetermined time in an electroless copper-plating solution, after which they may be carefully dried to prevent their sticking together and loaded into a porous electrode of a fuel cell according to well-known techniques. In the case of platinum, good electroless plating solutions are not readily available at this time, but when developed could be used similarly to the copper coating process. Platinum sputtering processes are well known which can be applied to randomly-agitated yttrium particles, or electrodeposition of platinum upon yttrium particles randomly agitated on a suitable electrode may also be used to accomplish the desired powder coating.

Accordingly, there has been provided a catalyst which in a preferred form comprises a very thin layer of copper or yttrium, which is relatively inexpensive, exhibits excellent performance, and does not expose both of the materials to the electrolyte as when an ordinary mixture of the two is used, thus increasing the potential useful life of the catalyst. In the case of the platinum-yttrium catalyst, the expense of the platinum is still incurred, but the measured improvements in performance compared to ordinary shiny platinum make it suitable for substitution for shiny platinum in various applications.

With regard to the thickness of the copper or platinum layer, if it is substantially less than one atomic layer in average thickness there will very likely be many areas of exposure of the underlying yttrium, resulting in simultaneous exposure of the coating material and the yttrium to the electrolyte, with the possibility of undesirable leaching or dissolution as described previously. However, if the layer is made too thick, the influence of the underlying yttrium on the environment adjacent the external coating surface is not effective to produce the desired improvements in performance, believed to be due to the previously-mentioned interstitial pumping action. Accordingly, the layer thickness is best selected to be from about 1 to 10 atomic layers, and in the preferred form about 1 to 3 atomic layers.

While the invention has been described with particular reference to specific embodiments thereof in the interest of complete definiteness, it will be understood that it may be embodied in a variety of forms diverse from those specifically shown and described, without departing from the spirit and scope of the invention as defined by the appended claims.

What is claimed is:

1. A hydrogen-oxidizing catalyst, comprising a body of yttrium having thereon a thin surface layer of copper or platinum.

2. The catalyst of claim 1, wherein said layer is from 1 to about 10 atomic layers in thickness.

3. The catalyst of claim 2, in which said layer is about 1 to 3 atomic layers in thickness.

4. The catalyst of claim 1, in which said layer is a plated layer.

5. The catalyst of claim 4, in which said layer is an electroless-plated layer.

6. The catalys of claim 4, in which said layer is an electrodeposited layer.

7. The catalyst of claim 1, wherein said body is a powder-sized particle.

8. A hydrogen-oxidizing electrode of a fuel cell, comprising as a catalyst a body of yttrium having a surface layer of copper or platinum thereon.

9. The electrode of claim 8, wherein said layer is a few atomic layers in thickness.

10. The electrode of claim 9, wherein said body is a particle of powder size.

11. A hydrogen-oxidizing catalyst comprising a powder of particles each comprising yttrium substantially completely covered with a thin layer of copper or platinum.

12. The catalyst of claim 11, in which said layer is about 1 to 10 atomic layers in thickness.

13. A fuel cell electrode comprising:

a porous electrode loaded with a powder comprising particles of yttrium coated with a thin surface layer of copper or platinum.

14. The anode of claim 13, wherein said surface layer is from about 1 to 10 atomic layers in thickness.

15. The anode of claim 14, wherein said thickness is from about 1 to about 3 atomic layers.

* * * * *